United States Patent Office
3,402,790
Patented Sept. 24, 1968

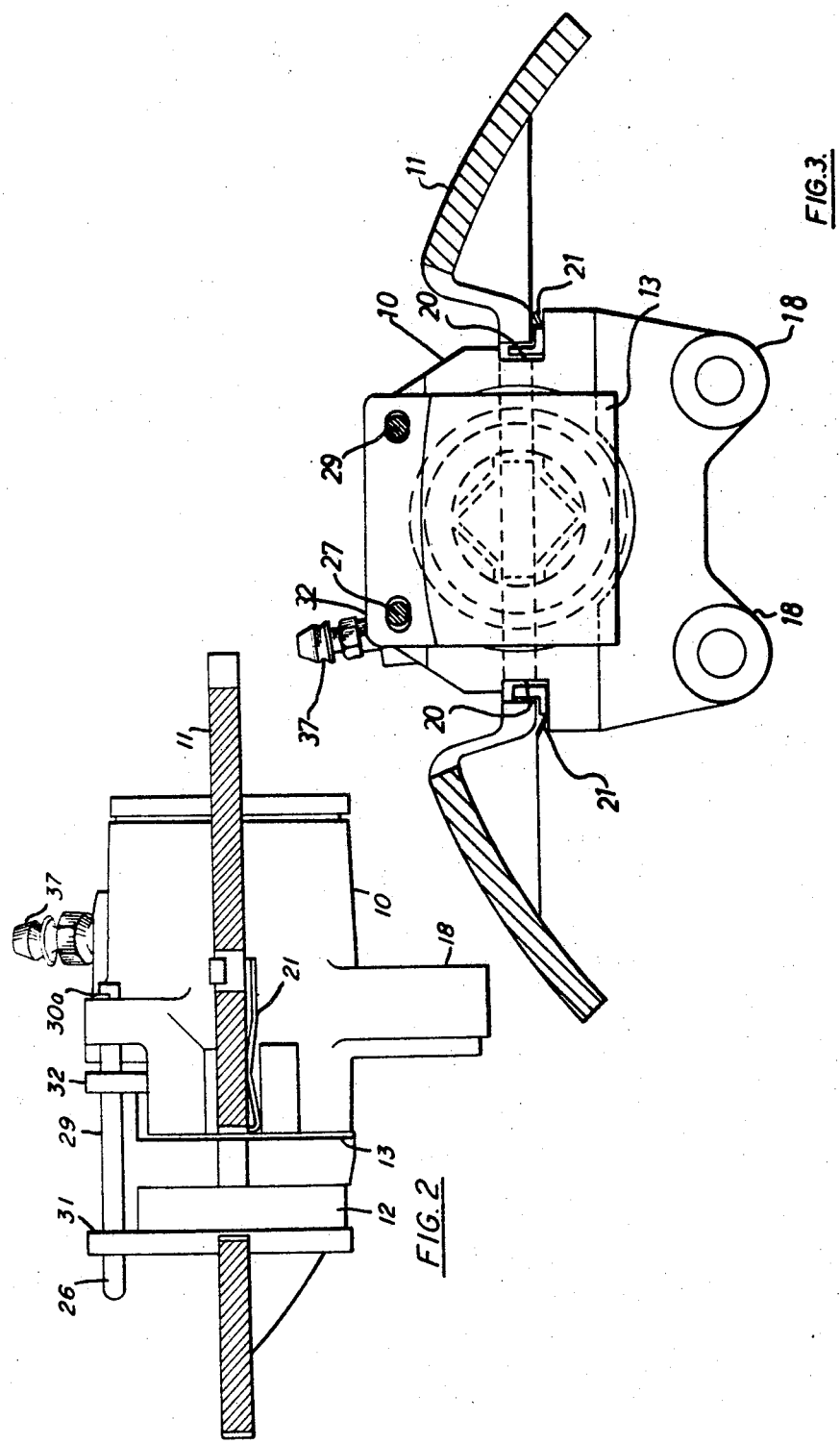

3,402,790
SPOT TYPE DISC BRAKES
Heinrich Bernhard Rath, Koblenz-Lutzel, Germany, assignor to Girling Limited, Birmingham, England
Filed Apr. 3, 1967, Ser. No. 627,880
Claims priority, application Great Britain, Apr. 1, 1966, 14,491/66
7 Claims. (Cl. 188—73)

ABSTRACT OF THE DISCLOSURE

A spot type disc brake comprises a hydraulic actuator including a body member and opposed pistons slidable in a through bore therein. One piston engages a yoke slidably mounted on the body member and operatively engaging an indirectly operated pad. The other piston engages a directly operated pad. The pads are supported by a U-shaped member of which one limb bottoms in a blind bore in the body member and the other limb passes through another bore in the body member and has a spring ring thereon to prevent its withdrawal. Protective boots are secured to the body member by spring rings and prevent the ingress of dirt into the cylinder. The yoke is prevented from contacting the adjacent boot by making the corresponding securing ring protrude axially beyond the boot.

---

The present invention relates to a spot type disc brake provided with a hydraulic actuator operative between a directly operated pad and a yoke adapted to support an indirectly operated pad.

According to one aspect of the present invention, the pads are freely supported for movement towards and away from one another by a U-shaped member of which one limb enters a blind bore in the body member of the hydraulic actuator and the other limb passes completely through a bore in the actuator body member, suitable releasable means being provided on the free end of said other limb for preventing its withdrawal from the corresponding bore.

According to another aspect of the invention the hydraulic actuator includes a piston abutting the yoke and provided with a protective boot which serves to prevent the ingress of dirt between the piston and its cylinder in the actuator body member and which is secured to the actuator body member by a ring which protrudes axially beyond the boot to prevent the yoke from contacting the boot.

Figure 1:
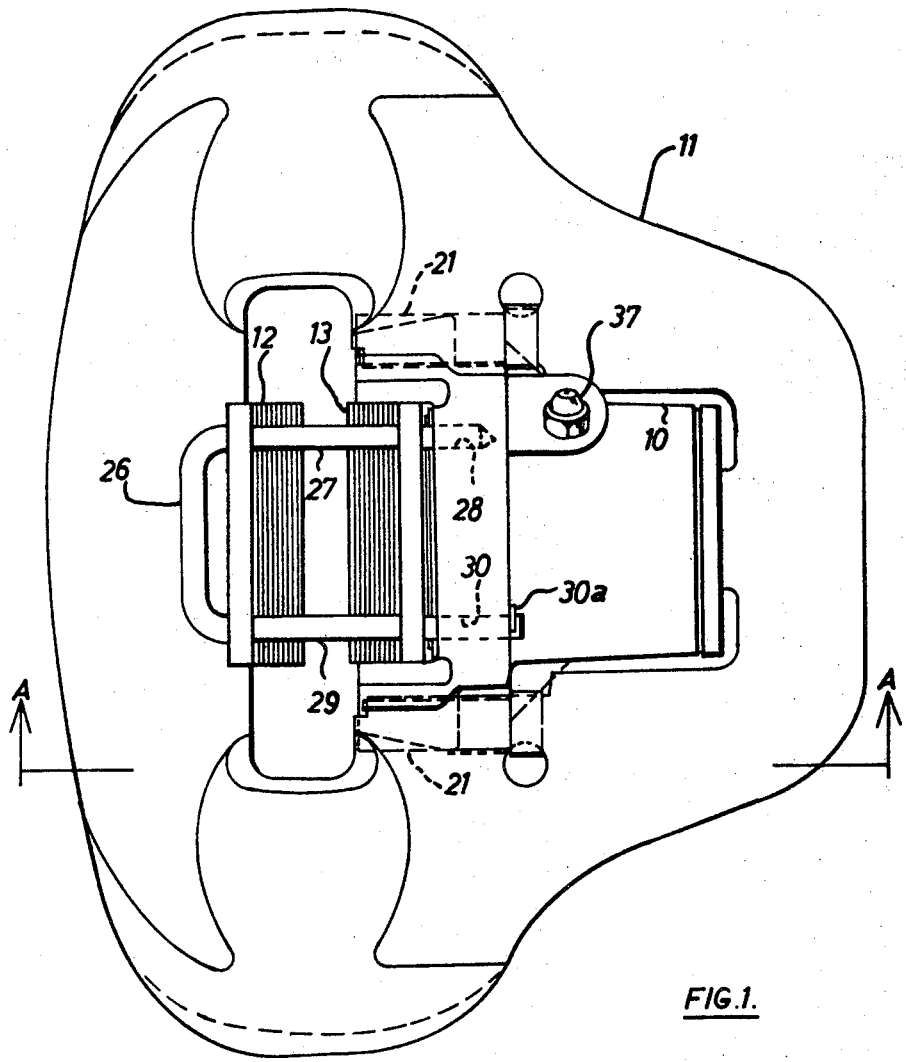
Figure 4:
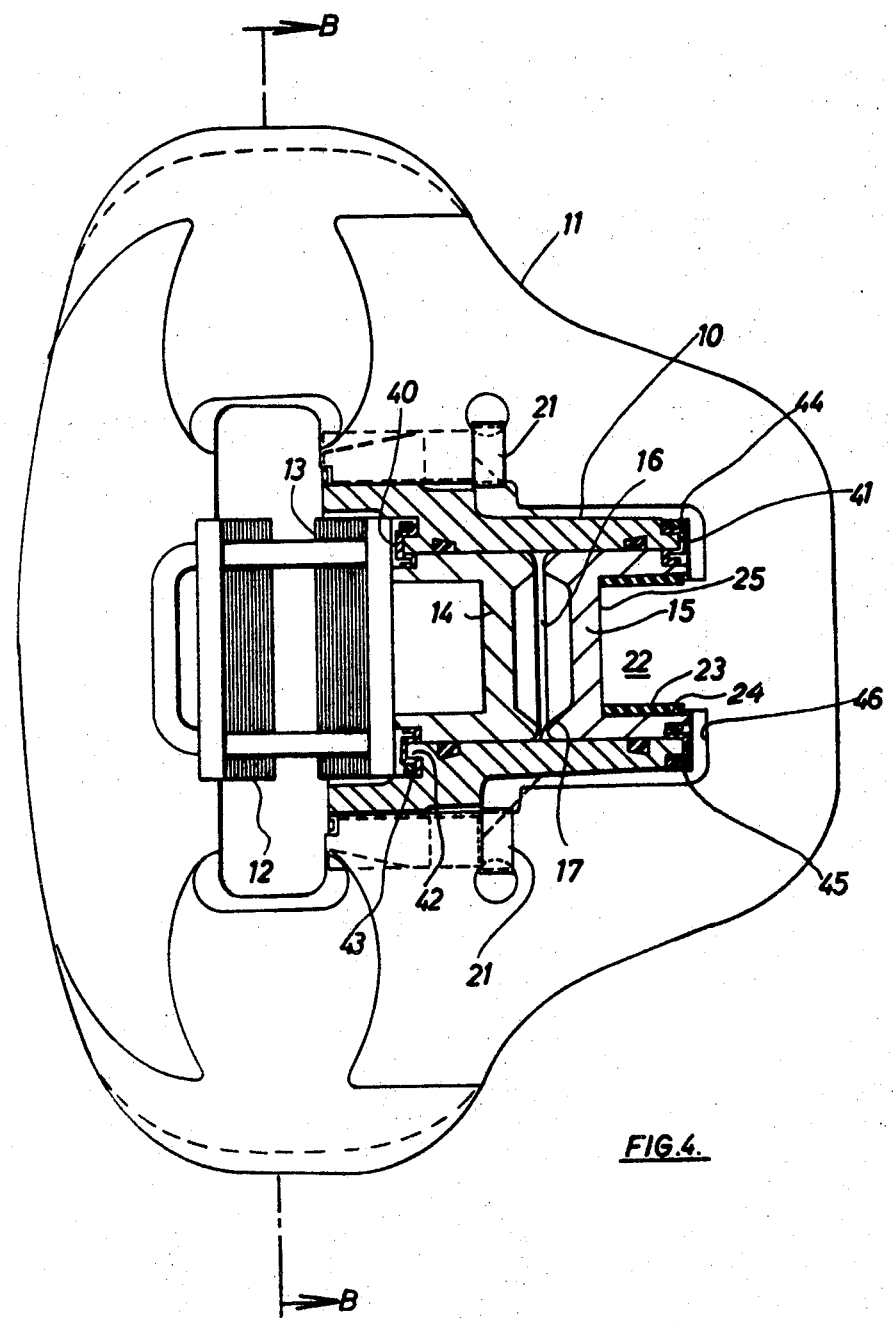

The invention is further described, by way of example, with reference to the accompanying drawings, in which:

FIG. 1 is a plan view of a spot type disc brake constructed in accordance with the invention;
FIG. 2 is a section on the line A—A of FIG. 1;
FIG. 3 is a section on the line B—B of FIG. 4; and
FIG. 4 is a sectional plan of the disc brake of FIG. 1.

Referring to the drawings, a spot type disc brake comprises a body member 10, a yoke 11 adapted to support an indirectly operated pad 12 and a hydraulic actuator formed within the body member 10 and operative between the yoke 11 and a directly operated pad 13. The hydraulic actuator comprises a pair of opposed pistons 14 and 15 slidable within a cylinder 16 constituted by a through bore 17 in the body member 10.

The body member 10 has a pair of mounting lugs 18 adapted to be bolted to a torque plate or other fixed part of the wheel mounting (not shown) adjacent a disc (also not shown) so that the disc periphery extends between the pads 12, 13. The body member 10 has a pair of longitudinal grooves 20 formed at opposite sides thereof in which grooves the inside edges of the yoke 11 are guided with clearance. A spring 21 acts between one wall of each groove 20 and the yoke to urge the yoke against the other walls of the groove 20 to avoid spragging. The yoke 11 is also located in the piston 15 by an inwardly extending tongue 22 formed integrally with the yoke and supported by a ring-like insert member 23 in a blind bore 24 in the piston 15. The base 25 of the blind bore 24 abuts the end of the tongue 22 to transmit the hydraulically produced force acting on the piston 15 to the yoke 11 and so to the indirectly operated pad 12.

A pad retaining member 26 of U-shape is supported in cantilever fashion by the body member 10. One limb 27 of the member 26 is received in a blind bore 28 in the body member whilst the other limb 29 passes right through a bore 30 in the body member. A spring clip 30a on the free end of the limb 29 prevents withdrawal of the member 26 from the body member 10. Bottoming of the limb 27 in the blind bore 28 prevents the retaining member 26 from sliding to the right (in FIG. 1). Lugs 31 and 32 formed on backing plates 33 and 34 respectively on the pads 12 and 13 have apertures through which the limbs 27 and 29 pass with clearance whereby the pads 12 and 13 are suspended and located in their appropriate positions. The inlet to the hydraulic cylinder 16 is not shown. A bleed screw 37 is provided at the top of the body member 10.

As can be seen more clearly in FIG. 4, the ingress of dirt between the pistons 14, 15 and the bore 17 is prevented by boots 40 and 41 of flexible rubber. The boot 40 on the piston 14 is secured on a nose 42 on the body member 10 by a spring ring 43. The boot 41 on the piston 15 is secured on a nose 44 on the body member 10 by a spring ring 45. To prevent the boot 41 from being engaged by the inside edge 46 of the yoke 11, e.g., during replacement of the pads, and thereby damaged, the spring ring 45 is made of sufficient axial thickness to stand proud of the boot and serve as an abutment for the edge 46 of the yoke.

I claim:
1. A spot type disc brake comprising opposed directly and indirectly operated pads, a hydraulic actuator which includes a body member having a cylinder formed therein, a piston slidable in said cylinder, a yoke slidably supported on said body member and adapted to engage said indirectly operated pad and said piston, a protective boot secured to said body member to prevent the ingress of dirt between said piston and said cylinder, a ring securing said boot to the body member, said ring protruding axially beyond said boot to prevent said yoke from contacting said boot, said actuator being operative between said yoke and said directly operated pad, said body member having therein an axial blind bore and an axial through bore, a U-shaped member having parallel limbs supporting said pads for movement towards and away from one another, one of said limbs of said U-shaped member entering said blind bore in said body member and the other of said limbs passing completely through said through bore in said body member, and releasable means on the free end of said other limb preventing withdrawal of said other limb from its bore.

2. A disc brake according to claim 1 in which said securing ring comprises a spring ring.

3. A disc brake according to claim 1 in which said cylinder in said actuator body member comprises a through bore therein and said actuator further includes a second piston slidable in said bore, opposed to the first-mentioned piston and operatively engaging said directly operated pad.

4. A spot type disc brake comprising opposed directly and indirectly operated pads, a hydraulic actuator which includes a body member having a cylinder therein and a piston slidable in said cylinder in the body member, a yoke slidably supported on said body member and adapted to engage said indirectly operated pad, said actuator being operative between said yoke and said directly operated pad with said said piston operatively engaging said yoke, a protective boot between said piston and said body member to prevent the ingress of dirt between said piston and said cylinder and a ring securing said boot to said body member, said ring projecting axially beyond said boot to prevent said yoke from contacting said boot.

5. A disc brake according to claim 4 in which said boot comprises flexible rubber.

6. A disc brake according to claim 4 in which said securing ring comprises a spring ring.

7. A disc brake according to claim 4 in which said cylinder in said actuator body member comprises a through bore therein and said actuator further includes a second piston slidable in said bore, opposed to the first-mentioned piston and operatively engaging said directly operated pad.

References Cited

UNITED STATES PATENTS 3,245,500   4/1966   Hambling et al.

MILTON BUCHLER, *Primary Examiner.*

GEORGE E. A. HALVOSA, *Assistant Examiner.*